United States Patent
Kuhn et al.

(10) Patent No.: US 12,139,800 B2
(45) Date of Patent: Nov. 12, 2024

(54) METHODS AND COMPOSITIONS FOR OXYGEN ELECTROCATALYSIS

(71) Applicant: University of South Florida, Tampa, FL (US)

(72) Inventors: John N. Kuhn, Wesley Chapel, FL (US); Swetha Ramani, Tampa, FL (US); Sadik Cogal, Lutz, FL (US); Jeffrey Lowe, Pinedale, WY (US); Venkat R. Bhethanabotla, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 448 days.

(21) Appl. No.: 17/414,791

(22) PCT Filed: Dec. 17, 2019

(86) PCT No.: PCT/US2019/066964
§ 371 (c)(1),
(2) Date: Jun. 16, 2021

(87) PCT Pub. No.: WO2020/131947
PCT Pub. Date: Jun. 25, 2020

(65) Prior Publication Data
US 2022/0081789 A1 Mar. 17, 2022

Related U.S. Application Data (60) Provisional application No. 62/780,822, filed on Dec. 17, 2018, provisional application No. 62/827,733, filed on Apr. 1, 2019.

(51) Int. Cl.
| C25B 11/075 | (2021.01) |
| C25B 1/04 | (2021.01) |
| C25B 11/057 | (2021.01) |

(52) U.S. Cl.
CPC .............. C25B 11/075 (2021.01); C25B 1/04 (2013.01); C25B 11/057 (2021.01)

(58) Field of Classification Search
CPC ...... B01J 23/75; B01J 23/755; B01J 27/1853; B01J 27/187; B01J 35/53; B01J 35/397;
(Continued)

(56) References Cited

U.S. PATENT DOCUMENTS

| 5,334,292 A | 8/1994 | Rajeeshwar et al. |
| 2004/0105980 A1* | 6/2004 | Sudarshan .............. H01F 1/447 428/404 |

(Continued)

FOREIGN PATENT DOCUMENTS

| CN | 104190921 | 12/2014 |
| CN | 109243842 A * | 1/2019 .............. H01G 11/24 |

(Continued)

OTHER PUBLICATIONS

Song et al "Electropolymerization of Aniline on Nickel-Based Electrocatalysts Substantially Enhances Their Performance for Hydrogen Evolution" Applied Energy Materials, 2018, 1, p. 3-8 . (Year: 2017).*

(Continued)

*Primary Examiner* — Patricia L. Hailey
(74) *Attorney, Agent, or Firm* — Quarles & Brady LLP (57) ABSTRACT

In one aspect, the disclosure relates to catalysts for electrochemical water splitting, in particular catalysts useful for oxygen evolution at an anode in electrochemical water splitting. The disclosed catalysts compositions comprise a catalyst core component, a shell component, and optionally a catalyst outer component; wherein the catalyst core component comprises a composition having the chemical formula $M_xP_y$; where M is a transition metal; wherein x is a number from about 1 to about 20; wherein y is a number (Continued)

from about 1 to about 20; wherein the shell component comprises a conducting polymer; and wherein the catalyst outer component is a transition metal that is not the same as the transition metal M. This abstract is intended as a scanning tool for purposes of searching in the particular art and is not intended to be limiting of the present disclosure.

13 Claims, 8 Drawing Sheets

(58) Field of Classification Search
CPC .. B01J 35/398; C25B 11/0785; C25B 11/057; C25B 1/04
USPC ................. 502/208, 213, 326; 428/403, 407
See application file for complete search history.

(56) References Cited

U.S. PATENT DOCUMENTS

| | | | | |
|---|---|---|---|---|
| 2008/0160416 | A1* | 7/2008 | Chen | H01M 4/364 |
| | | | | 428/403 |
| 2008/0171656 | A1* | 7/2008 | Wang | B01J 35/393 |
| | | | | 252/518.1 |
| 2009/0103247 | A1* | 4/2009 | Karnik | H01G 9/042 |
| | | | | 264/618 |
| 2016/0172676 | A1* | 6/2016 | Young | H01M 4/366 |
| | | | | 429/218.2 |
| 2016/0355936 | A1 | 12/2016 | Dismukes et al. | |
| 2017/0288211 | A1* | 10/2017 | Zhamu | H01M 4/386 |
| 2021/0351409 | A1* | 11/2021 | Lu | H01M 4/608 |
| 2023/0226528 | A1* | 7/2023 | Alwahedi | B01J 35/393 |
| | | | | 502/213 |

FOREIGN PATENT DOCUMENTS

| | | | | |
|---|---|---|---|---|
| CN | 110354905 A | * | 10/2019 | ............ B01J 31/28 |
| KR | 2016-0037779 | * | 4/2016 | ............... B22F 1/00 |

OTHER PUBLICATIONS

Swetha Ramani et al., "Hybrid Co@Ni12P5/PPy microspheres with dual synergies for high performance oxygen evolution." Journal of Catalysis 391, pp. 357-365. (Year: 2020).*
Marc Ledendecker et al., "The Synthesis of Nanostructured Ni5P4 Films and their Use as a Non-Noble Bifunctional Electrocatalyst for Full Water Splitting." Angewandte Chemie 127, pp. 12538-12542. (Year: 2015).*
J. Hu et al., "A theoretical study on the surface and interfacial properties of Ni3P for the hydrogen evolution reaction." Journal of Materials Chemistry A, 6, pp. 7827-7834. (Year: 2018).*
International Search Report and Written Opinion for PCT/US19/66962 mailed Mar. 5, 2020.
Hu et al. "A theoretical study on the surface and interfacial properties of Ni3P for the hydrogen evolution reaction" J. Mater. Chem. A 6 (2018) 7827-7834. (Abstract Only) retrieved from https://scholar.google.com/, on Aug. 15, 2024, 1 page.
Stern et al., "Ni 2 P as a Janus catalyst for water splitting: the oxygen evolution activity of Ni 2 P nanoparticles." Energy & Environmental Science 8.8 (2015): 2347-2351.
Ledendecker et al., "The Synthesis of Nanostructured Ni5P4 Films and their use as a Non-Noble Bifunctional Electrocatalyst for Full Water Splitting" Angew. Chem. 127 (2015) 12538-12542.
Menezes et al., "Uncovering the nature of active species of nickel phosphide catalysts in high-performance electrochemical overall water splitting." Acs Catalysis 7.1 (2017): 103-109.
Cao et al., "Surface modification of MnCo2O4 with conducting polypyrrole as a highly active bifunctional electrocatalyst for oxygen reduction and oxygen evolution reaction." Electrochimica Acta 180 (2015): 788-794.
Chang et al., "Core-shell structured Ni12P5/Ni3 (PO4) 2 hollow spheres as difunctional and efficient electrocatalysts for overall water electrolysis." Applied Catalysis B: Environmental 204 (2017): 486-496.

* cited by examiner

METHODS AND COMPOSITIONS FOR OXYGEN ELECTROCATALYSIS

CROSS-REFERENCE TO RELATED APPLICATIONS

This Application is a 371 National Phase of International Patent Application No. PCT/US2019/066964, filed Dec. 17, 2019 which claims the benefit of U.S. Provisional Application No. 62/780,822, filed on Dec. 17, 2018, and 62/827,733, filed on Apr. 1, 2019, all of which are incorporated herein by reference in their entireties.

STATEMENT REGARDING FEDERALLY SPONSORED RESEARCH OR DEVELOPMENT

This invention was made with government support EEC1301054 and EEC1560303 awarded by the National Science Foundation. The Government has certain rights in the invention.

BACKGROUND

Energy production via hydrogen using electrochemical water splitting is an emerging technology in clean and renewable storage of energy. The anodic oxygen evolution reaction (OER) is of the foremost concern for practical feasibility of alkaline water electrolyzers. Oxygen evolution requires a large overpotential due to the formation of high energy intermediates (Ref. 1). As a result of poor kinetics, conventional Pt/Ru/Ir based catalysts require an overpotential >0.25 V (Ref. 2). In addition, these elements are expensive, and not sufficiently abundant to meet future energy application needs. Recent research has seen development of catalysts utilizing alloys of Pt group metals, transition metal oxides, nitrides, chalcogenides or phosphides. However, many of these catalysts still exhibit low efficiency in terms of overpotential.

Despite advances in research directed to catalysts for efficient electrochemical water splitting to generate hydrogen, there remain a scarcity of catalysts that do not require a large overpotential at the anodic oxygen reaction. These needs and other needs are satisfied by the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 1A-1B show representative schematic illustrations of disclosed catalysts.

FIGS. 2A-2B show representative data pertaining to disclosed catalysts.

FIGS. 3A-3L show representative images and color mapping for a disclosed catalyst and a disclosed core-shell catalyst. FIGS. 3D-3F show representative energy-dispersive X-ray spectroscopy images of a disclosed core-shell catalyst, $Ni_{12}P_5/PPy$.

FIGS. 4A-4H show representative transmission electron microscopy (TEM) images.

FIGS. 5A-5F show representative high resolution X-ray photoelectron spectroscopy (XPS) profile data and atomic percent data for Ni in a disclosed catalyst and a disclosed core-shell catalyst. The figures are as follows: FIG. 5A, C 1s profile data; FIG. 5B, O 1s profile data; FIG. 5C, N 1s profile data; FIG. 5D, P 2p profile data; and FIG. 5E, Ni 2p profile data.

FIGS. 6A-6B show representative linear sweep voltammetry (LSV) and Tafel slope data for disclosed catalysts.

FIGS. 7A-7D show electrochemical analysis data (carried out in 1 M KOH).

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a transition metal," "a catalyst," or "a polypyrrole," including, but not limited to, two or more such transition metals, catalysts, or polypyrroles, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a transition metal refers to an amount that is sufficient to achieve the desired improvement in the property modulated by the formulation component, e.g. achieving the desired improvement in oxygen overpotential. The specific level in terms of wt %, ppm, or amount of a component, such as a transition metal, in a composition required as an effective amount will depend upon a variety of factors including the amount and type of transition metal, amount and type of shell component, such as polypyrrole, amount, and type of additional transition metal electrodeposited onto the shell component.

As used herein, the terms "optional" or "optionally" means that the subsequently described event or circumstance can or cannot occur, and that the description includes instances where said event or circumstance occurs and instances where it does not.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

Unless otherwise specified, temperatures referred to herein are based on atmospheric pressure (i.e. one atmosphere).

Catalyst Compositions

In various aspects, disclosed herein are catalyst compositions comprising a catalyst core component, a shell component, and optionally a catalyst outer component. In some instances, the disclosed catalyst composition comprises a catalyst core component, a shell component, and a catalyst outer component. Collectively, a catalyst composition comprising a catalyst core component, a shell component, and a catalyst outer component can be referred herein throughout as a disclosed hybrid core-shell catalyst composition. A catalyst core, in various aspects, can comprise at least one transition metal phosphide, i.e., at least one transition metal and phosphorus. The shell component can be a conducting polymer, such as a polypyrrole, a polyaniline, a polythiophene, or combinations thereof. In various aspects, the catalyst outer component can be a transition metal. In other instances, the disclosed catalyst composition comprises a catalyst core component and a shell component. Collectively, a catalyst composition comprising a catalyst core component and a shell component can be referred herein throughout as a disclosed core-shell catalyst composition.

Figure 1A:
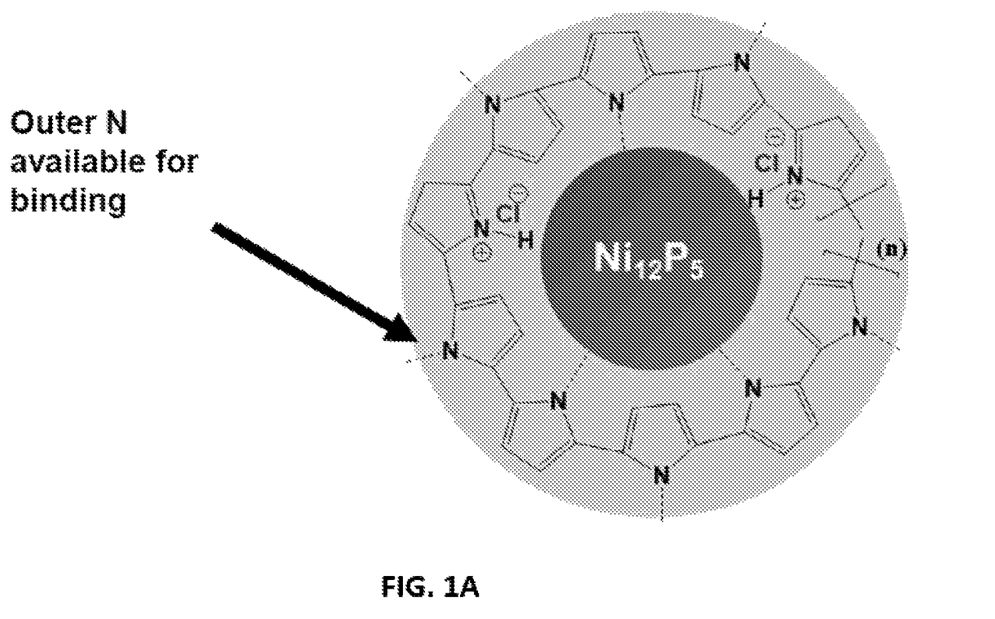
FIG. 1A shows a schematic illustration of a disclosed core-shell catalyst comprising a conducting polymer shell, e.g., polypyrrole, and a core comprising a transition metal catalyst, e.g., $Ni_{12}P_5$. The figure indicates (see arrow) that the undoped outer nitrogen sites can be available for binding.
Figure 1B:
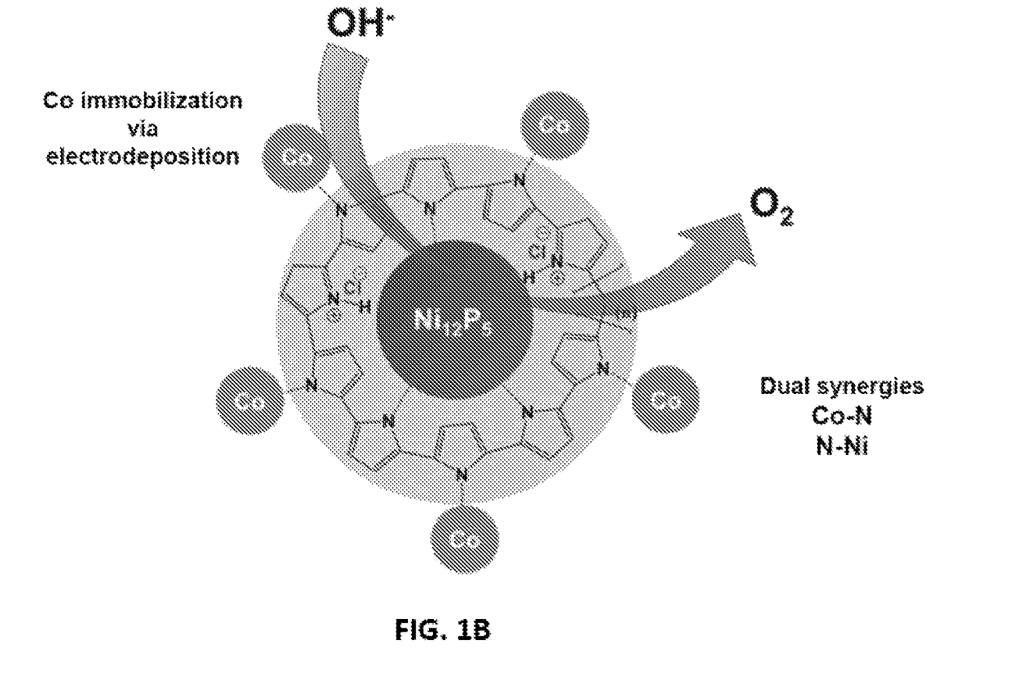
FIG. 1B shows a schematic illustration of a disclosed core-shell catalyst comprising a conducting polymer shell (e.g., polypyrrole) and a transition metal phosphide (e.g., $Ni_{12}P_5$) core. Further, the outer N sites from PPy is bound to cobalt by electrodeposition. The figure further shows the catalytic reaction for conversion of $OH^-$ to $O_2$.

A schematic representation of a disclosed composition comprising a catalyst core component and a shell component is shown FIG. 1A. As shown therein, in some instances, the shell component comprises a conducting polymer with nitrogen available for binding. The nitrogen in the conducting polymer can bind to the catalyst core which it surrounds. However, not all nitrogen in the conducting polymer are necessarily bound to the catalyst core, thereby providing unbound nitrogen which can bind to the outer catalyst component. A schematic representation is shown in FIG. 1B of a disclosed catalyst composition comprising a catalyst core component and a shell component, with a catalyst outer component immobilized on the shell component. As shown therein, some of the nitrogen in the conducting polymer of the shell component are bound to the catalyst outer component. Without wishing to be bound by a particular theory, it is believed that the catalyst outer component is located on an outer surface of the conducting polymer of the shell component. That is, dispersed between the catalyst outer component and the catalyst core component is the shell component comprising the conducting polymer. It should be noted that FIG. 1B further shows a reaction catalyzed by the disclosed catalyst in which a hydroxide ion is converted to oxygen. Without wishing to be bound by a particular theory, it is believe that the disclosed catalyst composition a catalyst core component, a shell component, and a catalyst outer component provide a synergic effect comprising the transition metal of the core catalyst interacting with a nitrogen in the shell component and the transition metal in the catalyst outer component interacting with another nitrogen in the shell component.

Energy production via hydrogen using electrochemical water splitting is an emerging technology in clean and renewable storage of energy. The anodic oxygen evolution reaction (OER) is of the foremost concern for practical feasibility of alkaline water electrolyzers. Oxygen evolution requires a large overpotential due to the formation of high energy intermediates Ref. 1). As a result of poor kinetics, even the state of art Pt/Ru/Ir based catalysts require an overpotential >0.25 V (Ref. 2). In addition, these elements are expensive, and not sufficiently abundant to meet future energy application needs. Recent research has seen development of robust catalysts like alloys of Pt group metals, transition metal oxides, nitrides, chalcogenides or phosphides. However, many of these catalysts still exhibit low proficiency in terms of overpotential. The disclosed catalyst compositions comprising abundant transition metals catalysts overcome the high overpotential and provide new catalysts for electrochemical water splitting.

Although, heretofore, transition metal (TM) catalysts, especially Mn, Co and Ni based, have shown promising results outpacing the finest commercial catalysts (Ref. 3). In particular, TM phosphides (TMPs) have received considerable attention towards OER owing to their stability in electrolysis potential range. Among conventional TMPs, nickel phosphide is an attractive catalyst that is reasonably stable and available in multiple stoichiometries, e.g., $Ni_3P$ (Ref. 4), $Ni_{12}P_5$, $Ni_2P$ (Ref. 5), and $Ni_5P_4$ (Ref. 6), which are active in water splitting reactions. Recently, Menezes et al reported that $Ni_{12}P_5$ is an effective catalyst for OER due to excess stoichiometric Ni, resulting in higher density of active sites (Ref. 7). Research on these catalysts typically focuses on understanding the kinetics and stability. The disclosed catalysts herein provide an improved catalyst composition with enhanced electrochemical performance obtained via modifying the surface functionalities using a conducting polymer.

Conducting polymers (CPs) such as polypyrrole (PPy), polyaniline (PANI) and polythiophenes (PTh) have been previously described (Ref. 8). Among these, PPy is frequently studied as a conducting polymer due to its conductivity, ease of synthesis, biocompatibility, chemical stability as well as its porous structure and high surface area (Ref. 9). Moreover, PPy has nitrogen as a heteroatom, which can form M-N bonds with different materials resulting in enhanced electrocatalytic activity (Ref. 10). For example, integrating an electronegative N to a cationic Ni site can affect the electronic state of Ni resulting in stable higher oxidation states. Cao et al. (Ref. 11) modified the surface of $MnCo_2O_4$ with PPy by in situ chemical polymerization of excess pyrrole with $H_2O_2$ (10 wt. %) and found that the PPy layer on $MnCo_2O_4$ surface provided a conductive network for fast electron transfer resulting in enhanced electrocatalytic activities for both ORR and OER. Jia et al. (Ref. 12) demonstrated that a ternary CoNiMn-LDH/PPy/RGO composite exhibited bifunctional electrocatalysts for OER and ORR with enhanced catalytic activities because of the synergic effect among the three different constituents, thus, highlighting the charge transfer properties of conjugated PPy in overall electrocatalytic performance of the composites.

The disclosed catalysts herein provide a class of hybrid catalysts comprised of core-shell structure with a catalyst outer component, e.g., $Co@Ni_{12}P_5$/PPy. The M-N catalyst core interacting with a nitrogen of the shell component acts as an active site for OER due to accelerated charge transfer rate between the layers. It is expected that this synergic interaction (M-N) modulates the electron density around the metal atom by inducing charge redistribution resulting in altered binding energies of hydroxide or intermediate ions at the active site. Conventional TMPs exhibit lower activity compared to bimetallic phosphides due to change in energy for chemisorption of hydroxide at the active site (M-O; see Ref. 13). Recently, Mendoza-Garcia et al (Ref. 14) reported a bimetallic $Co_{(2-x)}Fe_xP$ catalyst that showed enhanced electrochemical performance compared to $Co_2P$ or $Fe_2P$ due to alloying effect. Li et al (Ref. 15) have reported using 3D NiCoP on Ni foam. The catalyst compositions disclosed herein tailor the electronic properties of two different metals by functionalizing with a conducting polymer. As a result, a dual synergic effect is obtained, e.g., Co—N and N—Ni, with Co anchored at the N in PPy shell. Without wishing to be bound by a particular theory, it is believed that simultaneous integration of conducting properties with high density of catalytic active sites (M-N) is associated with the highly enhanced electrochemical OER activity realized with the disclosed catalysts.

In various aspects, a catalyst core comprises a composition having a chemical formula of $M_xP_y$, where M is a transition metal, P is phosphorus, x is a number from about 1 to about 20, and y is a number from about 1 to about 20. In some instances, x and y are integer numbers. In a further aspect, M is a transition metal selected from a metal from Group 3 to Group 12 of the periodic table that is a d-block metal. In a still further aspect, M is a transition metal selected from Mn, Co, and Ni. In a yet further aspect, M is Ni. In a further aspect, x is a number selected from 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60; any range encompassed by the foregoing values; and any combination of the foregoing values. In a further aspect, y is a number selected from 1, 2, 3, 4, 5, 6, 7, 8, 9, 10, 11, 12, 13, 14, 15, 16, 17, 18, 19, 20; any range encompassed by the foregoing values; and any combination of the foregoing values. In a further aspect, M is Ni. In a still further aspect, the catalyst core comprises $Ni_3P$, $Ni_{12}P_5$, $Ni_2P$, or $Ni_5P_4$. In a particular aspect, the catalyst core comprises $Ni_{12}P_5$.

In some instances, the catalyst core has a three-dimensional shape that is spherical, pseudo-spherical, ellipsoidal, and the like. In some instances, the catalyst core has a three-dimensional shape that is a distribution of irregularly shaped particles. The catalyst core has a size such that the longest axis of the catalyst core three-dimensional shape is from about 100 nm to about 2 µm.

The shell component, as described above, is a conducting polymer such as polypyrrole, polyaniline, polythiophene, and combinations thereof. In general, the conducting polymer is polymerized in a suspension comprising the appropriate monomer and the catalyst core, e.g., in the form of microspheres, such the conducting polymer polymerizes on the surface of the catalyst core. In various aspects, the shell component has a thickness of about 10 nm to about 1000 nm. That is, the shell component can have a thickness of about 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, 600 nm, 610 nm, 620 nm, 630 nm, 640 nm, 650 nm, 660 nm, 670 nm, 680 nm, 690 nm, 700 nm, 710 nm, 720 nm, 730 nm, 740 nm, 750 nm, 760 nm, 770 nm, 780 nm, 790 nm, 800 nm, 810 nm, 820 nm, 830 nm, 840 nm, 850 nm, 860 nm, 870 nm, 880 nm, 890 nm, 900 nm, 910 nm, 920 nm, 930 nm, 940 nm, 950 nm, 960 nm, 970 nm, 980 nm, 990 nm, 1000 nm; a range encompassed by any of the foregoing values; or any combination of the foregoing values. In a further aspect, the shell component can have a thickness of about 100 nm to about 150 nm, about 100 nm to about 200 nm, about 100 nm to about 250 nm, about 100 nm to about 300 nm, about 100 nm to about 350 nm, about 100 nm to about 400 nm, about 100 nm to about 450 nm, or about 100 nm to about 500 nm.

Methods of Preparing the Catalyst Compositions

The disclosed catalyst compositions are prepared via a sequential series of synthesis steps. First, the core catalyst is prepared, e.g., using a method similar to that described by Ni, et al (Ref. 16). Second, the shell component is polymerized onto the surface of the core catalyst in a suitable solvent, e.g., water, with a suitable monomer, e.g., pyrrole. The core catalyst is present as a suspension in the solvent at a suitable concentration, e.g., about 1 mg to about 1000 mg of the catalyst core per milliliter of suspension. Sonication or another suitable method can be used to suspend the core catalyst in the solvent. The monomer can be used a suitable concentration similar to that described in the Examples herein below. A suitable oxidant, e.g., ferric chloride (FeCl$_3$), can be used in a manner as described herein below in the Examples. Third, the catalyst outer component can be immobilized on the core-shell catalyst prepared as described in the foregoing, e.g., by electrodeposition, as described herein below.

Methods of Using the Catalyst Compositions

The disclosed catalyst compositions can be used as a catalyst for oxygen electrocatalysis as shown for the anodic reaction in the following:

Cathodic: $4H^+ + 4e^- \rightarrow 2H_2$

Anodic: $2H_2O \rightarrow O_2 + 4H^+ + 4e^-$

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

REFERENCES

Herein throughout, certain references are referred to and cited. These references are listed herein below and correspond to the specific citation of a given reference in a format such as Ref. 1, Ref. 2, Refs. 1-10, and the like.

Ref. 1. Y. Cheng, S. P. Jiang, *Progress in Natural Science: Materials International* 2015, 25, 545-553.

Ref. 2. T. Reier, M. Oezaslan, P. Strasser, *ACS Catalysis* 2012, 2, 1765-1772.

Ref. 3. R. Subbaraman, D. Tripkovic, K.-C. Chang, D. Strmcnik, A. P. Paulikas, P. Hirunsit, M. Chan, J. Greeley, V. Stamenkovic, N. M. Markovic, *Nature Materials* 2012, 11, 550.

Ref. 4. J. Hu, S. Zheng, X. Zhao, X. Yao, Z. Chen, *Journal of Materials Chemistry A* 2018, 6, 7827-7834.

Ref. 5. L.-A. Stern, L. Feng, F. Song, X. Hu, *Energy & Environmental Science* 2015, 8, 2347-2351.

Ref. 6. M. Ledendecker, S. Krick Calderón, C. Papp, H.-P. Steinrück, M. Antonietti, M. Shalom, *Angewandte Chemie* 2015, 127, 12538-12542.

Ref. 7. P. W. Menezes, A. Indra, C. Das, C. Walter, C. Göbel, V. Gutkin, D. Schmeißer, M. Driess, *ACS Catalysis* 2017, 7, 103-109.

Ref. 8. (a) J. G. Ibanez, M. E. Rincón, S. Gutierrez-Granados, M. h. Chahma, O. A. Jaramillo-Quintero, B. A. Frontana-Uribe, *Chemical Reviews* 2018, 118, 4731-4816; and (b) Q. Zhou, G. Shi, *Journal of the American Chemical Society* 2016, 138, 2868-2876.

Ref. 9. (a) C. Zhu, J. Zhai, D. Wen, S. Dong, *Journal of Materials Chemistry* 2012, 22, 6300-6306; and (b) A. Liu, C. Li, H. Bai, G. Shi, *The Journal of Physical Chemistry C* 2010, 114, 22783-22789.

Ref. 10. R. Bashyam, P. Zelenay, *Nature* 2006, 443, 63.

Ref. 11. X. Cao, W. Yan, C. Jin, J. Tian, K. Ke, R. Yang, *Electrochimica Acta* 2015, 180, 788-794.

Ref. 12. X. Jia, S. Gao, T. Liu, D. Li, P. Tang, Y. Feng, *Electrochimica Acta* 2017, 245, 59-68.

Ref. 13. A. Dutta, N. Pradhan, *The Journal of Physical Chemistry Letters* 2017, 8, 144-152.

Ref. 14. A. Mendoza-Garcia, H. Zhu, Y. Yu, Q. Li, L. Zhou, D. Su, M. J. Kramer, S. Sun, *Angewandte Chemie International Edition* 2015, 54, 9642-9645.

Ref. 15. Y. Li, H. Zhang, M. Jiang, Y. Kuang, X. Sun, X. Duan, *Nano Research* 2016, 9, 2251-2259.

Ref. 16. Y. Ni, K. Liao, J. Li, *Cryst Eng Comm* 2010, 12, 1568-1575.

Ref. 17. F. N. Ajjan, M. J. Jafari, T. Rębiś, T. Ederth, O. Inganäs, *Journal of Materials Chemistry A* 2015, 3, 12927-12937.

Ref. 18. G. Qi, Z. Wu, H. Wang, *Journal of Materials Chemistry C* 2013, 1, 7102-7110.

Ref. 19. Y. Pan, Y. Liu, J. Zhao, K. Yang, J. Liang, D. Liu, W. Hu, D. Liu, Y. Liu, C. Liu, *Journal of Materials Chemistry A* 2015, 3, 1656-1665.

Ref. 20. A. Razaq, A. Mihranyan, K. Welch, L. Nyholm, M. Strømme, *The Journal of Physical Chemistry B* 2009, 113, 426-433.

Ref. 21. H.-D. Sha, X. Yuan, X.-X. Hu, H. Lin, W. Wen, Z.-F. Ma, *Journal of The Electrochemical Society* 2013, 160, F507-F513.

Ref. 22. Z. Huang, Z. Chen, Z. Chen, C. Lv, H. Meng, C. Zhang, *ACS Nano* 2014, 8, 8121-8129.

Ref. 23. F. Lallemand, D. Auguste, C. Amato, L. Hevesi, J. Delhalle, Z. Mekhalif, *Electrochimica Acta* 2007, 52, 4334-4341.

Ref. 24. D.-G. Lee, S. H. Kim, S. H. Joo, H.-I. Ji, H. Tavassol, Y. Jeon, S. Choi, M.-H. Lee, C. Kim, S. K. Kwak, G. Kim, H.-K. Song, *Energy & Environmental Science* 2017, 10, 523-527.

Ref. 25. X. Li, M. Zhu, B. Dai, *Applied Catalysis B: Environmental* 2013, 142-143, 234-240.

Ref. 26. Z. Yin, C. Zhu, C. Li, S. Zhang, X. Zhang, Y. Chen, *Nanoscale* 2016, 8, 19129-19138.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Materials. All chemicals were used as received. $NiCl_2.6H_2O$ (Sigma Aldrich, 99.9%), $CoCl_2.6H_2O$ (Sigma Aldrich, 98% ACS reagent), $NaH_2PO_2.H_2O$ (sigma Aldrich, >99%), $NaHCO_3$ (Sigma Aldrich, >98%), Pyrrole (Sigma Aldrich, 98%), $FeCl_3$ (Sigma Aldrich, 97%) and $LiClO_4$ (Alfa Aesar, 95%). The state of art $RuO_2$, obtained from Sigma Aldrich, was 99.9% pure.

Synthesis of $Ni_{12}P_5$ Catalyst Core. $Ni_{12}P_5$ catalyst core, in the form of microspheres, was synthesized using a procedure developed by Ni et al (Ref. 16). In a typical synthesis, $NiCl_2.6H_2O$ and $CoCl_2.6H_2O$ were taken in 1:2 molar ratio. $NaH_2PO_2.H_2O$ was added as the phosphorous source in 20 mL DI water. The pH was adjusted using $NaHCO_3$. All contents were transferred to a Teflon autoclave and heated at 170° C. for 10 h. The resulting precipitate was washed several times with DI water and ethanol. Finally, the microspheres were dried at 60° C. overnight.

Synthesis of $Ni_{12}P_5$/PPy composite. $Ni_{12}P_5$/PPy composite was prepared via oxidative chemical polymerization. Typically, 60 mg of $Ni_{12}P_5$ and 30 μL of pyrrole were dispersed in 6 mL DW and sonicated for 30 min to obtain a good dispersion. In a separate flask, 70.2 mg $FeCl_3$ was dissolved in 6 mL DW. Then, the $FeCl_3$ solution was added to the monomer solution slowly under continuous stirring. The final solution was refluxed at room temperature overnight. The product was obtained by centrifugation and then washed several times with DW. Finally, the obtained $Ni_{12}P_5$/PPy composite was dried at 60° C. for 24 h.

Electrodeposition of Co on $Ni_{12}P_5$/PPy. Deposition of cobalt on $Ni_{12}P_5$@PPy composite was performed in aqueous solution containing 0.05 M $CoCl_2.6H_2O$ with 0.1 M $LiClO_4$ as supporting electrolyte. The deposition was carried out through chronoamperometric conditions at a potential of 1.0 V vs. Ag/AgCl for 30 seconds. After deposition of Co, the electrode was rinsed DI water and dried in air. Additionally, Co was also deposited on bare PPy and $Ni_{12}P_5$ for control experiments.

Characterization of materials. The phase and structure of $Ni_{12}P_5$ and $Ni_{12}P_5$/PPy were characterized by X-ray diffraction (Bruker/D8 Advance) using Cu anode target ($\lambda$=1.5418 Å). Fourier transform infrared (FTIR) spectroscopy analysis was performed in a FTIR spectrophotometer (Thermo Scientific). Analysis of morphology and composition was done by SEM-EDS using Hitachi S-800 Electron Microscope with an accelerating voltage of 25 kV at 15 mm working distance. TEM analysis was done using a Tecnai F20 transmission electron microscope with a point resolution of 0.24 nm. Surface analysis was done on catalysts using Thermo Scientific K-Alpha XPS system.

Electrochemical analysis. A Gamry electrochemical workstation was used to study the electrocatalytic OER activity of all catalysts using a rotating disk electrode (RDE). Pt wire as counter and saturated calomel (SCE) reference electrodes were employed. After every measurement, SCE was kept in distilled water and thoroughly cleaned before storing in 4M KCl. Electrode inks were prepared by sonicating 2.0 mg sample in 500 μL isopropanol, 500 μL distilled water and Nafion™ (1 wt %; 10 μL) for 30 min. 10 μL was drop casted onto the glassy carbon electrode (GCE) and dried in air. Prior to any electrochemical measurement, working electrode was cleaned thoroughly with 0.05 μm alumina and 1M KOH electrolyte was purged for 20 mins with $N_2$. Cyclic voltammetry (CV) and linear sweep voltammetry (LSV) measurements were done at 50 mV/s and 5 mV/s, respectively over a potential range (1.2-1.86 V vs RHE). EIS measurements were taken at a potential of 1.66V vs RHE. Each catalysts were at least tested three times under same experimental conditions.

Figure 2A:
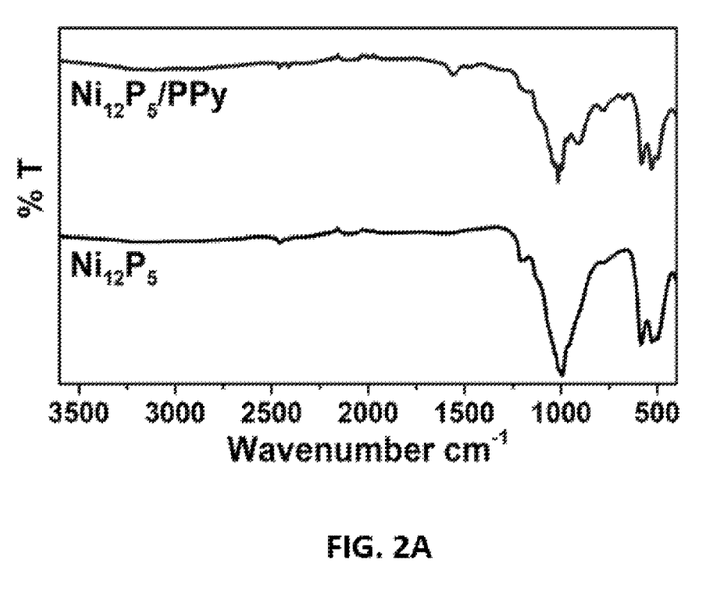
FIG. 2A shows a representative IR spectrum of a disclosed catalyst, $Ni_{12}P_5$ microspheres, and a disclosed core-shell catalyst comprising $Ni_{12}P_5/PPy$.
Figure 2B:
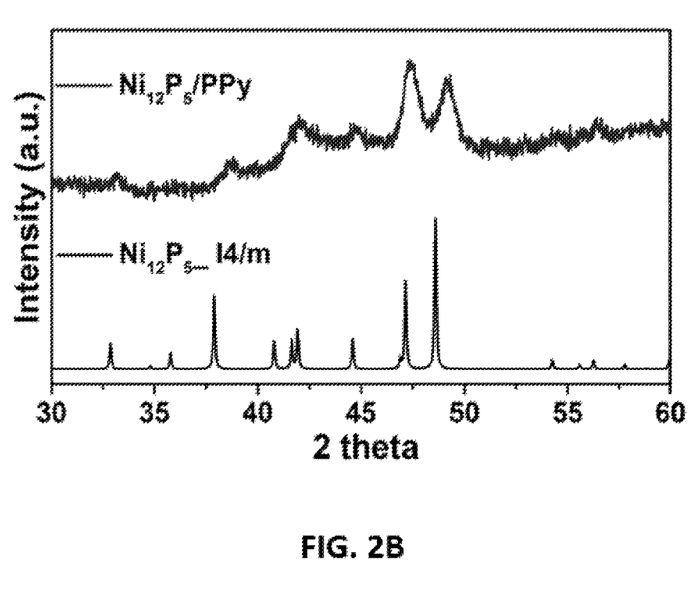
FIG. 2B shows phase determination by powder X-ray diffraction (PXRD) showing the diffraction pattern of $Ni_{12}P_5/PPy$.

Characterization and Analysis of Disclosed Catalysts. A catalyst core comprising $Ni_{12}P_5$ microspheres was synthesized via a scalable template based hydrothermal method. The microspheres were then modified to form a disclosed core shell catalyst, i.e., $Ni_{12}P_5$/PPy composite comprising $Ni_{12}P_5$ catalyst core and a shell comprising polypyrrole, PPy. The PPy was prepared by chemical polymerization of pyrrole using $FeCl_3$ as an oxidant. The shell comprising PPy provided a doped polypyrrole (PPy) shell comprising random $N^+Cl^-$ centers. Introduction of PPy shell around the $Ni_{12}P_5$ catalyst core resulted in new vibrational peaks at 1559 and 1476 $cm^{-1}$, indicating the asymmetric and symmetric ring stretching modes of PPy as shown in FIG. 2A (for comparison see Ref. 17). The peaks at 1298 and 1174 $cm^{-1}$ correspond to the stretching of the C—N and C—H deformation vibrations of PPy (for reference see Ref. 18). Also, a characteristic peak at 1080 $cm^{-1}$, in both $Ni_{12}P_5$ as well as $Ni_{12}P_5$/PPy, corresponding to Ni—$P_{str}$ confirmed the formation of a metal phosphide.[19] The phase and structure of the $Ni_{12}P_5$/PPy core-shell catalyst determined using PXRD presented a tetragonal space group −I4/m as shown in FIG. 2B. The intense broad peaks indicate the presence of small crystallite size (1.17 μm obtained by calculation using the Scherrer equation). A single wide peak near 41-42.5° corresponds to three lattice planes (202), (321) and (400) of $Ni_{12}P_5$. There is no crystalline peak arising from PPy.

Polymerization of PPy around the catalyst core was done using $FeCl_3$ as an oxidant. Varying the oxidants can result in different electrical conductivity, specific surface area, porosity, etc. For example, Sha et al. showed that the type of oxidant used in the preparation of PPy-based catalysts affected the catalytic activity of the resulting catalyst (see Ref. 21). The catalyst prepared using $FeCl_3$ as an oxidant showed better electrocatalytic performance compared to using other oxidants including ammonium persulphate (APS) and hydrogen peroxide ($H_2O_2$; see Ref. 21). While employing $FeCl_3$ can provide effective doping of the conducting polymer, its strong oxidizing nature may potentially affect the morphology and structure of the shell. Interestingly, the tetragonal phase as well as the spherical morphology remained intact in the composite confirming its robust nature.

Figure 3A:
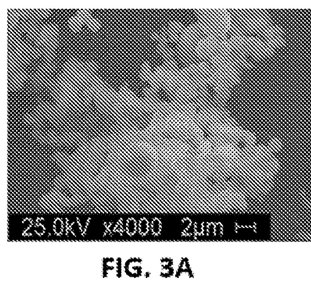
FIGS. 3A-3C showing representative scanning electron microscopy (SEM) images of a disclosed catalyst, $Ni_{12}P_5$ microspheres, showing morphology of $Ni_{12}P_5$ microspheres. The SEM conditions and a scalar bar are shown at the bottom of each image.
Figure 3B:
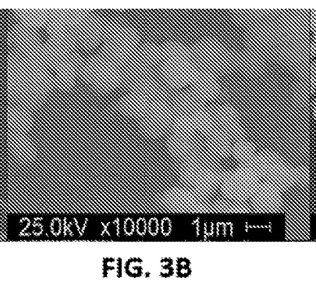
Figure 3C:
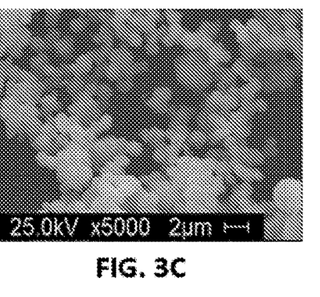
Figure 3D:
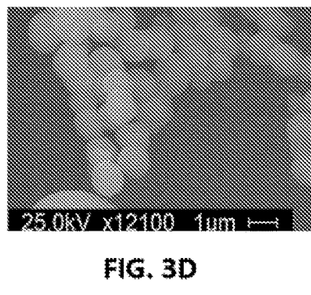
FIGS. 3D-3F show representative energy-dispersive X-ray spectroscopy images of a disclosed catalyst, $Ni_{12}P_5$ microspheres.
Figure 3E:
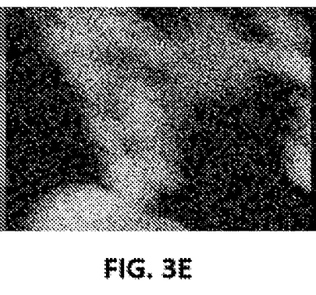
Figure 3F:
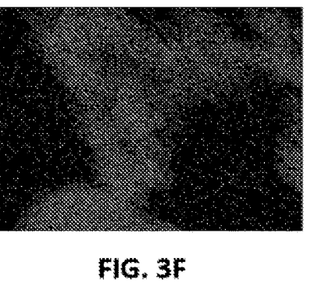
Figure 3G:
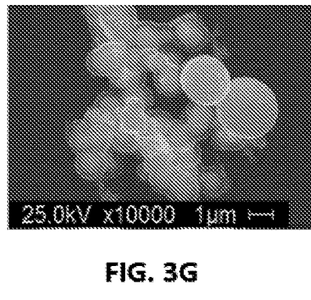
FIGS. 3G-3I showing representative scanning electron microscopy (SEM) images of a disclosed core-shell catalyst, $Ni_{12}P_5/PPy$, showing the core-shell structure. The SEM conditions and a scalar bar are shown at the bottom of each image.
Figure 3H:
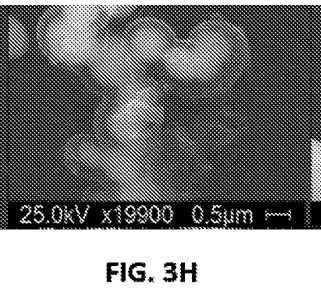
Figure 3I:
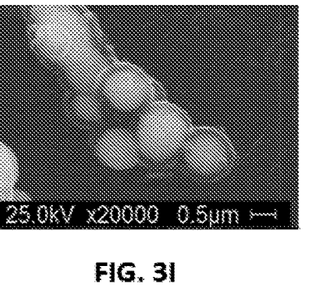
Figure 3J:
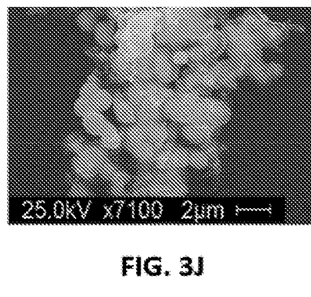
Figure 3K:
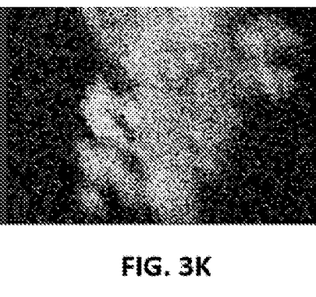
Figure 3L:
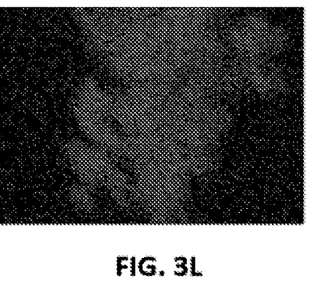
Figure 4A:
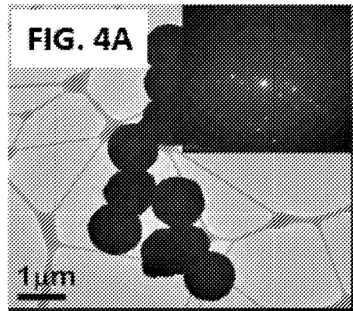
FIGS. 4A-4B) show TEM images of a disclosed catalyst, $Ni_{12}P_5$ microspheres (inset in FIG. 4A shows SAED pattern).
Figure 4B:
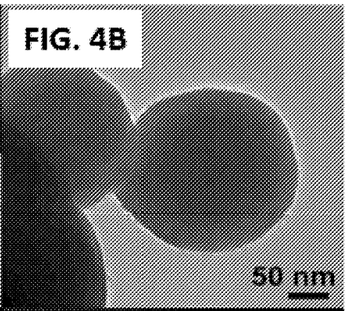
Figure 4C:
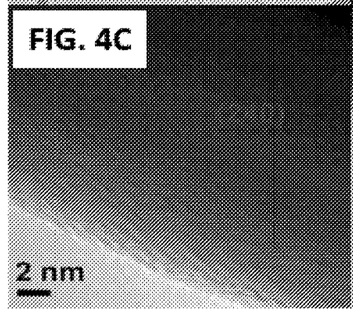
FIGS. 4C-4D show HRTEM images showing the exposed planes (240) and (112) as indicated.
Figure 4D:
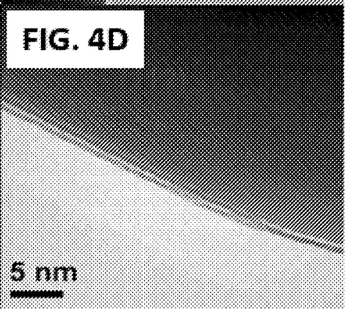
Figure 4E:
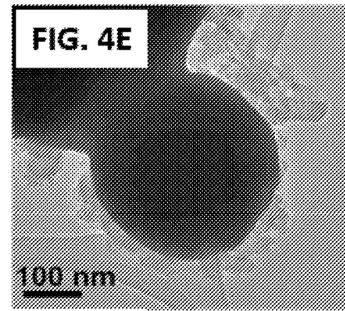
FIGS. 4E-4G show TEM images of a disclosed core-shell catalyst, $Ni_{12}P_5/PPy$.
Figure 4F:
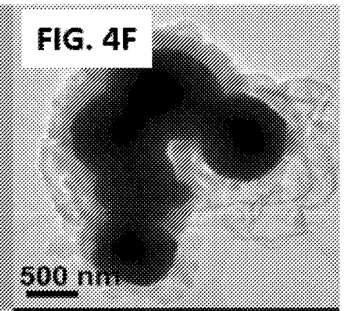
Figure 4G:
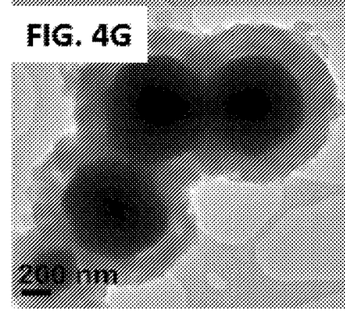
Figure 4H:
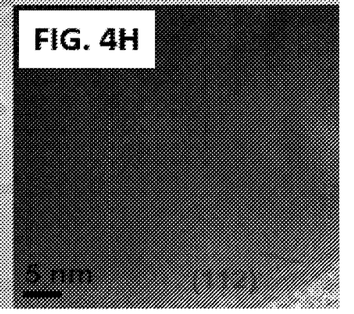
FIG. 4H shows a HRTEM image showing the (112) plane as indicated. Each image shows a scalar bar as indicated.

SEM images in FIGS. 3A-3C display $Ni_{12}P_5$ microspheres of approximately 1 μm diameter corroborating the results obtained using the Scherrer equation. A core shell structure of $Ni_{12}P_5$/PPy was confirmed in FIGS. 3G-3I, showing a continuous envelope of the polymer on the $Ni_{12}P_5$ catalyst core. EDS color mapping of the catalysts indicates the uniform distribution of Ni and P in the core, as shown in FIGS. 3E-3F and 3J-3L. The selected mapping area is shown in FIG. 3D and 3J, respectively. For precise morphological remarks, TEM images of the $Ni_{12}P_5$ catalyst care are shown in FIGS. 4A-4C. A highly crystalline SAED pattern is shown in the inset corresponding to $Ni_{12}P_5$ catalyst core in FIG. 4A. HRTEM analysis revealed two exposed crystallographic planes corresponding to (240) and (112) of the I4/m phase. The TEM images of the $Ni_{12}P_5$/PPy core shell structure are shown in FIGS. 4E-4G. The images show different stages of polymerization. Initially, an inconsistent thin layer of polymerization occurs at the surface of the $Ni_{12}P_5$ microspheres (see FIG. 4E). Polymerization occurs selectively around the catalyst core. Without wishing to be bound by a particular theory, this is likely due to electrostatic interaction of Py monomer at the $Ni_{12}P_5$ surface prior to oxidation. The images show that the polymer chain spreads along the catalyst core completely covering the surface (see FIG. 4F). Through the process of aging, polypyrrole forms a uniform shell of approximately 200 nm thickness (see FIG. 4G). Despite this thick shell, HRTEM exposes (112) lattice plane of $Ni_{12}P_5$, suggesting a porous amorphous nature of the PPy shell. It is possible that the amorphous nature of the PPy shell possibly prevented the crystalline SAED spots. It is believed, without wishing to be bound by a particular theory, that a highly porous PPy shell can allow efficient diffusion of reactant molecules to the Ni-PPy interface.

Figure 5A:
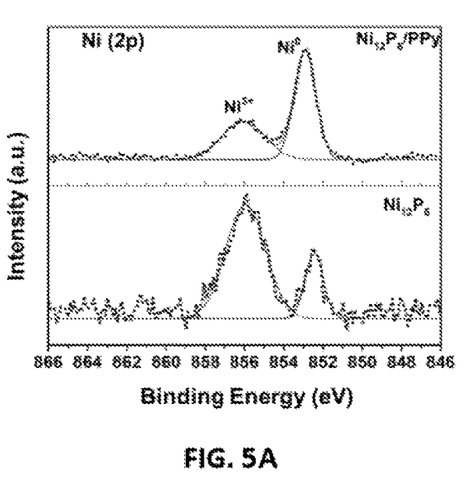
Figure 5B:
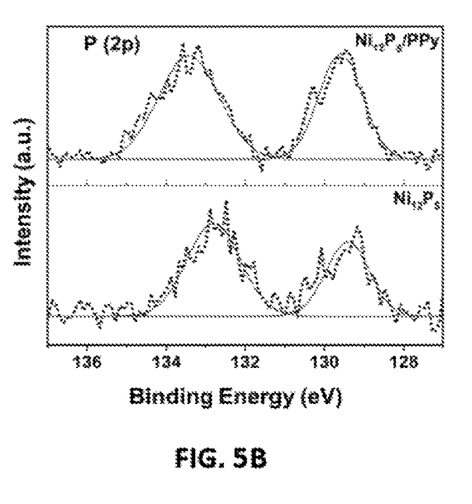
Figure 5C:
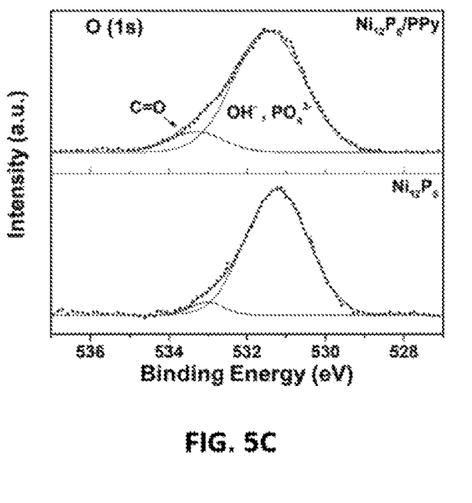
Figure 5D:
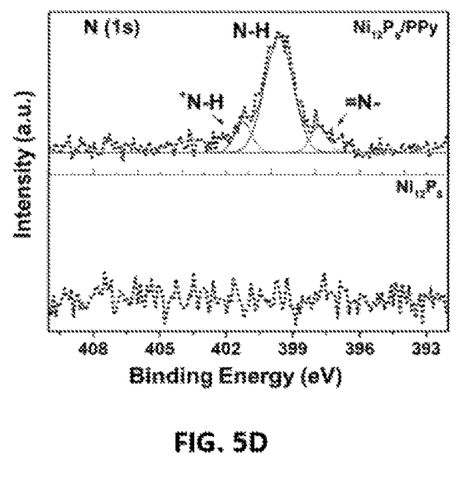
Figure 5E:
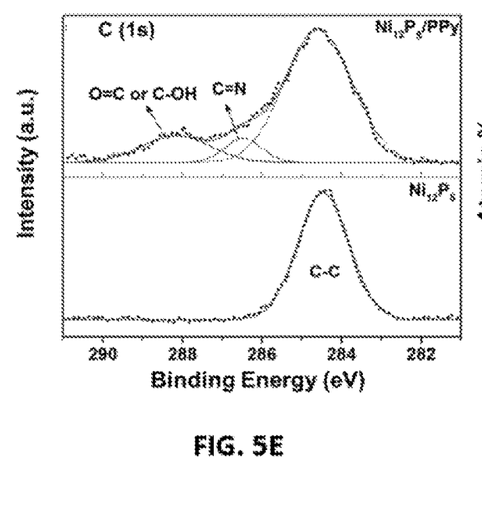

Insights into understanding the role of the disclosed PPy shell can be obtained from change in chemical states of each element. FIGS. 5A-5E show XPS profile data. These data suggest the possible interaction of PPy with the $Ni_{12}P_5$ core. Metal phosphides have a strong tendency for surface oxidation leading to phosphates (P 2p-133 eV). Therefore, it is common for Ni to exist in mixed oxidation states i.e. +2 (nickel phosphate) and a small positive $+\delta(0<\delta<2)$ corresponding to 855.9 eV and 852.4 eV, respectively (FIG. 5A; for reference see Ref. 22). The typical peak at 129.4 eV confirms the formation of metal phosphide with $P^{\delta-}$ (FIG. 5B). Furthermore, the adsorbed $OH^-$ and $PO_4^{3-}$ seen in O 1s (FIG. 5C) corroborates the highly oxidative surface. There are no extra peaks observed in the O 1s profile, most likely due to polymerization on the catalyst core. Appearance of characteristic C=N, C—OH or C=O peaks in C 1s profile (FIG. 5E) of the composites confirms the successful introduction of the conjugated polymer shell. The C—C peak at 284.8 eV is from the carbon paper used as substrate for the analysis. The XPS profile of N shows no peak for $Ni_{12}P_5$, as expected. However, N exists in three different coordination environment in the composites (FIG. 5D) i.e. =N—, undoped N—H center and doped $^+$N—H center (for comparison, see Ref. 23). The =N— peak points out the highly conjugated nature of the polymer and unlocalized electrons contributing to aromaticity of the monomer. The peak at 399.6 eV likely arises due to the uneven doping by $FeCl_3$, as mentioned earlier, forming an electropositive N center with higher binding energy. The most intense peak likely arises due to a large number of undoped N centers at slightly lower binding energy (399.2 eV). These undoped N centers in PPy can act as probable binding sites for Ni.

Figure 5F:
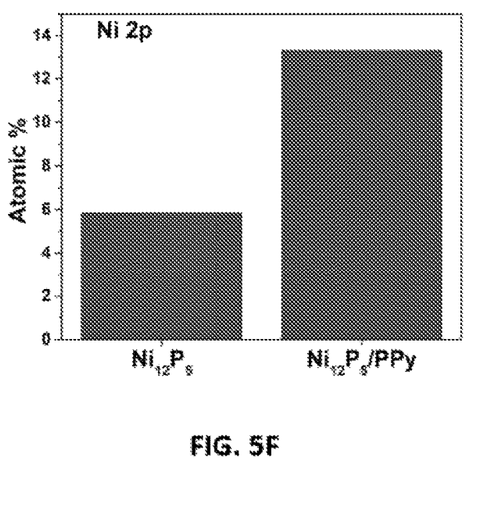
FIG. 5F shows % atomic concentration obtained from XPS results that show the resulting surface enrichment of Ni in the composites by a factor of 2.
Figure 6A:
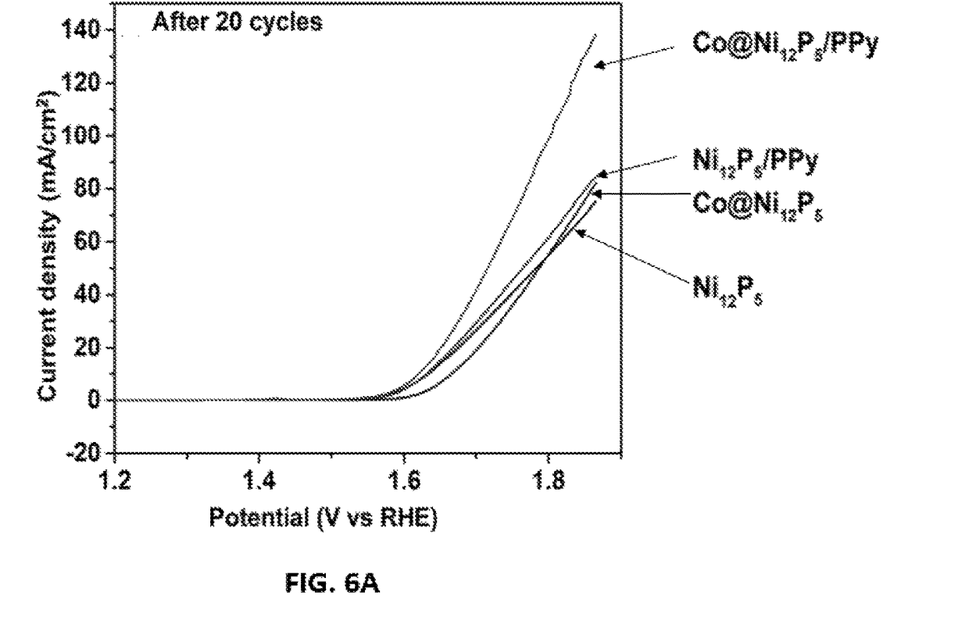
FIG. 6A shows representative LSV data for oxygen evolution reaction (OER) in 1 M KOH after 20 cycle for different catalysts as indicated.
Figure 6B:
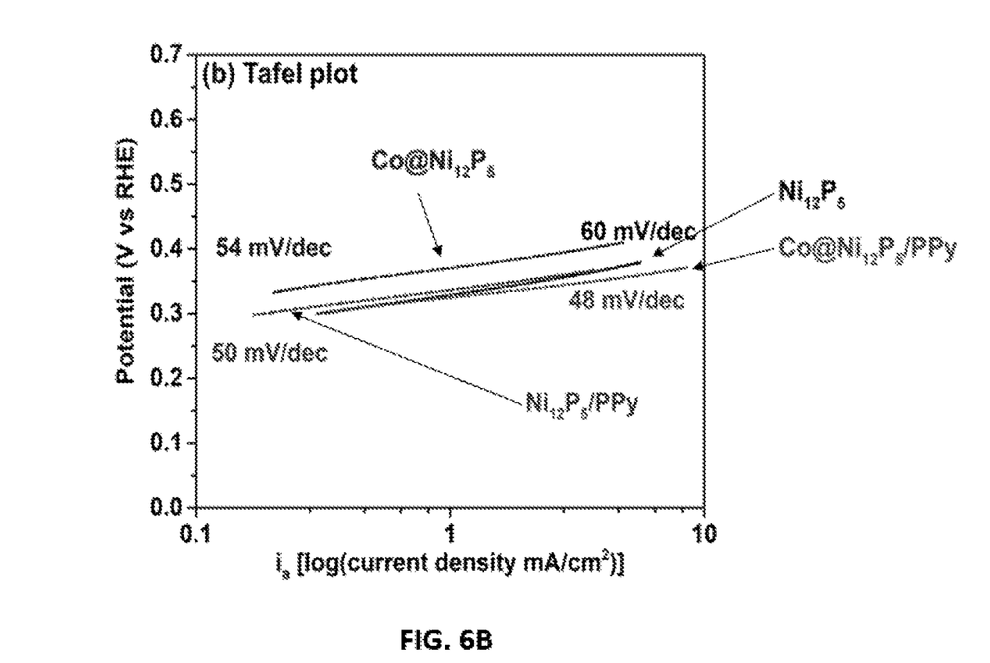
FIG. 6B shows representative Tafel slopes for different catalysts as indicated.

To confirm this Ni—N interaction, relative intensities and peak position of $Ni^{\delta++}$ in both the catalyst cores and composites were evaluated. There is no change in the intensity of $Ni^{2+}$ due to PPy incorporation. However, the relative intensity of $Ni^{\delta+}$ in $Ni_{12}P_5$/PPy and $Ni_{12}P_5$ increases drastically along with a shift of 0.5 eV towards higher binding energy. Due to the intervention of electronegative N, the binding energy of $Ni^{\delta+}$ shifts to generate a slightly more positive $Ni^{\delta++}$. The electronegative N in PPy also promotes selective diffusion of $Ni^{\delta+}$ to the surface via electrostatic interaction. This Ni enriched surface increases the probability of binding strongly with undoped N of the polymer. The resulting surface enrichment of Ni is confirmed by increase in % atomic concentration in the composites by a factor of 2, obtained from XPS results (FIG. 5F).

With enhanced conducting properties of $Ni_{12}P_5$/PPy and an electropositive $Ni^{\delta++}$ center, the disclosed core-shell catalysts are believed to have higher potential in electrocatalytic activity for oxygen evolution reaction (OER). Alkaline medium OER was performed on the core-shell catalysts using a rotating ring disk electrode (RDE) at 1600 rpm in 1M KOH. Electrochemical OER performance of $Ni_{12}P_5$/PPy showed improvement in total current density as well as the Tafel slopes (FIGS. 5(a) and (b)), in comparison to $Ni_{12}P_5$. The decrease in Tafel slope from 60 mV/dec to 50 mV/dec for the composites emphasize the role of PPy and improved charge transfer properties. Hydroxide ions from the electrolyte can diffuse through the highly porous PPy shell to the extremely active N—Ni interface.

Instead of a metal phosphide surface, the active site now comprises highly polarized N—Ni. As evidenced from XPS results, the polymer composite has higher amounts of Ni at the interface, potentially increasing the number of active sites. The Ni—N bond extends the ability of electron transfer properties at the core shell interface by inducing a more positive nickel center. These sites can exhibit high affinity for chemisorption of negatively charged hydroxyl molecules. Therefore, a layer of PPy covering the $Ni_{12}P_5$ catalyst core assists in: (a) a conductive pathway for fast electron transfer due to highly polarized nickel and nitrogen; (b) longer electron diffusion paths due to conjugation in the polymer; and (c) increase in active sites due to surface enrichment of Ni. Due to strong electron coupling interactions, synergic M-N sites can be created at the interface of the catalyst core and polymer shell.

As discussed above, the undoped N centers near the $Ni_{12}P_5$ core can bind to positively charged Ni. However, the undoped N centers at the outer edge are still available for additional binding. Due to high affinity for N, transition metals are perfect candidates for anchoring at this site, forming a hybrid core-shell catalyst. In this example, Co was introduced at this site to not only enhance the density of active sites, but to also alter the overpotential of OER due to mixed M-N (Co—N and N—Ni) sites. To incorporate Co onto $Ni_{12}P_5$/PPy layer, an electrodeposition method was employed. This hybrid core-shell catalyst is denoted as Co@$Ni_{12}P_5$/PPy indicating the multiple layers.

Figure 7A:
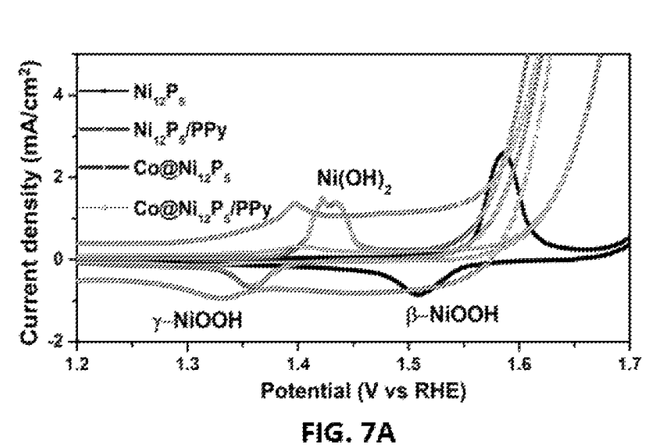
FIG. 7A shows redox peaks for different catalysts as indicated showing intermediates involved.
Figure 7B:
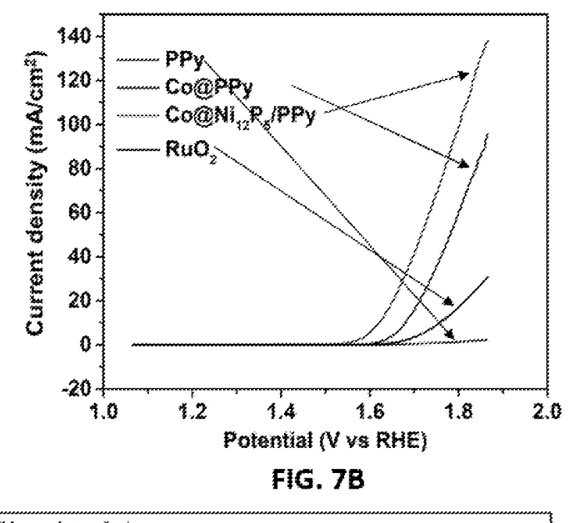
FIG. 7B shows control studies comparing the activity of a disclosed core-shell catalyst, $Co@Ni_{12}P_5/PPy$, PPy, Co@PPy and state of art $RuO_2$.

Electrochemical diagnostic techniques such as cyclic voltammetry (CV) and linear sweep voltammetry (LSV) were employed to characterize the properties of Co@$Ni_{12}P_5$/PPy. During electrodeposition, N atoms in pyrrole units may act as anchoring sites for immobilization of Co, introducing a new Co—N interface. A PPy shell with two different metals anchored to its edges may provide dual M-N sites with extended electron conjugation. The hybrid Co@$Ni_{12}P_5$/PPy drastically increases the current to 140 mA/cm$^2$ at 1.86 V (vs RHE). A low $\eta_{10}$ of 1.66 V arises due to dual synergic effect, Co—N and N—Ni. Incorporation of multiple M-N bonds in a conjugated PPy matrix alters the electron cloud density of the metals affecting the hydroxyl adsorption for OER.[24] To elucidate the role of PPy a control study was performed where Co was electrodeposited directly on a $Ni_{12}P_5$ catalyst core, without the PPy shell as shown in FIG. 7B (for comparison see Ref. 25). This worsened the overpotential required for OER for three possible reasons: (a) the absence of N—C electron donor character at the surface of the catalyst core decreases the anchoring sites for Co; (b) the absence of surface enrichment of Ni triggered by PPy can decrease the overall active sites for oxygen binding; and (c) Co introduction can alter the overpotential in Ni—Co bimetallic catalysts, depending on the extent of doping. However, the binding energies of intermediates are modified resulting in a decreased Tafel slope of 54 mV/dec.

For further understanding of the significant improvement in activity of the disclosed hybrid core-shell catalysts, cyclic voltammetric curves were studied for all catalysts. Ni based catalysts demonstrate a typical redox peak pertaining to $Ni^{+2}(OH)_2/Ni^{+3}OOH$ as shown in FIG. 7A. This reversible conversion reveals a conductive $Ni^{+3}OOH$ phase resulting in enhanced conducting properties (e.g., see Ref. 26 for comparison). There is an evident negative shift in the $Ni^{2+}/Ni^{3+}$ oxidation peak potential via surface modification with PPy and Co. Modification of the surface with Co and PPy results in cathodic peak shift from 1.45 V to 1.42 V and 1.40 V in $Co@Ni_{12}P_5$ and $Co@Ni_{12}P_5/PPy$, respectively. Without wishing to be bound by a particular theory, these data suggest a strong interaction between different layers of the hybrid core-shell catalyst exhibiting higher valence states of metal at a low potential. Metals in higher valence states are better active sites for OER (e.g., for comparison see Ref. 26). However, the effect of bimetallic active sites in $Co@Ni_{12}P_5$ on $OH^-$ binding energies resulted in a high OER overpotential as shown in FIG. 7B.

Other control experiments were performed to estimate the activity of PPy and Co@PPy (FIG. 7B). The polymer by itself has no appreciable OER activity and requires a metal active site to produce a substantial amount of current. Though anchoring Co over PPy does improve the activity of PPy, the high overpotential due to Co is still not overcome. Consequently, in the disclosed hybrid core-shell catalyst, a dual synergic effect was exhibited by Co and Ni with PPy providing electronegative N sites. Increased number of M-N active sites significantly improved the OER performance along with a low Tafel slope of 48 mV/dec. The disclosed hybrid core-shell catalyst outperformed the traditional $RuO_2$ both in terms of onset potential and current density (FIG. 7B).

Figure 7C:
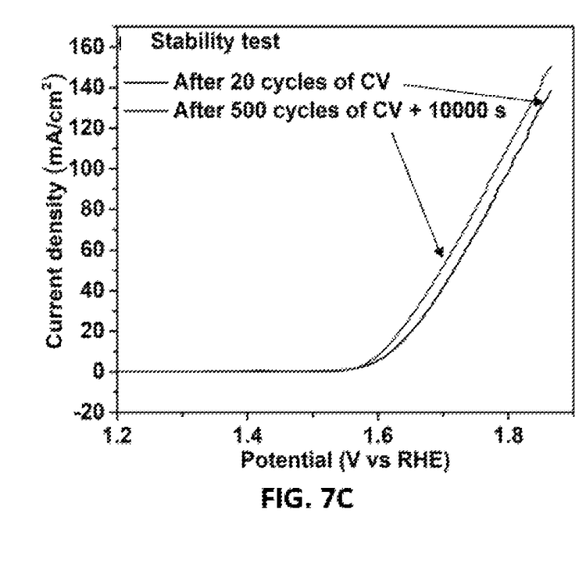
FIG. 7C shows stability test data of a disclosed catalyst, $Co@Ni_{12}P_5/PPy$, after 500 cycles of CV and 10000 s of chronoamperometry.

Though many catalysts exhibit excellent potential in OER, repeated cycling results in metal dissolution leading to decreased performance. Subsequently, stability tests were performed on $Co@Ni_{12}P_5/PPy$ as shown in FIG. 7C. The data show that there is an enhancement in the total current density with a 10 mV decrease in the onset potential after 500 cycles of CV and 10000 s of chronoamperometry. Considering its excellent stability in alkaline conditions, it is significant to understand the charge transfer kinetics of the hybrid $Co@Ni_{12}P_5/PPy$ catalyst.

Figure 7D:
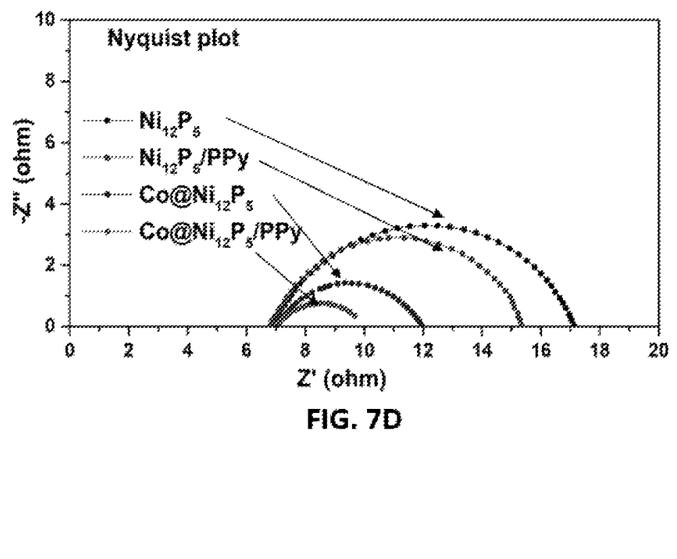
FIG. 7D shows a Nyquist plot showing Rd for the indicated catalysts.

Electrochemical impedance analysis was performed at OER operating potential on these catalysts as shown in FIG. 7D. The experimental impedance data were fitted for each catalyst as per the equivalent electrical circuit is given in the inset of FIG. 7A. All catalysts exhibited a solution resistance ($R_s$) in the range of 6.8-7.1Ω. The trend in charge transfer resistance ($R_{ct}$) obtained from the Nyquist plot is given as: $Co@Ni_{12}P_5/PPy$ (2.93Ω)<Co@NiP (4.91Ω)<$Ni_{12}P_5/PPy$ (8.51Ω)<$Ni_{12}P_5$ (10.19Ω). The charge transfer resistance is greatly reduced in the hybrid $Co@Ni_{12}P_5/PPy$, which validates the low Tafel slope. The incorporation of higher amount of M-N bonds in the catalyst effectively improves the rate of charge transfer and electron diffusion in the catalyst. In addition to this, the calculated capacitance values obtained using Gamry analyst software indicates a 50-fold increase for the hybrid $Co@Ni_{12}P_5/PPy$ in comparison to $Ni_{12}P_5$ as shown in Table 1 below.

Since the unitless fitting parameter n is >0.78 for all catalysts, capacitance due to CPE can be considered to be quasi-equivalent to pure capacitance. Data in Table 1 shows an increase in capacitance from 0.15 $mF/cm^2$ ($Ni_{12}P_5$) to 3.24 $mF/cm^2$ ($Ni_{12}P_5/PPy$). Without wishing to be bound by a particular, it is believed that this trend can be attributed to the electronic interaction between the core-shell morphology. With the introduction of dual synergic effect via Co electrodeposition, there is an enhanced potential for charge storage in $Co@Ni_{12}P_5/PPy$ with a capacitance of 8.20 $mF/cm^2$. Without wishing to be bound by a particular theory, it is believed that the trend in CPE values can be directly extrapolated to electrochemically active surface area (ECSA) of the catalysts. From higher capacitive behavior of the hybrid core-shell catalyst, it can be concluded that it possess the highest surface area accessible for oxygen evolution. Intrinsic conjugation in the conducting polymer provides good electrical contact at the metal polymer interface on both edges. Without wishing to be bound by a particular theory, it is believed that this extended electron transfer property may be responsible for the enhanced conducting properties in the hybrid catalyst.

In the present example, a hybrid core-shell catalyst with a precise choice of individual components leading to excellent OER activity in alkaline medium. This hybrid $Co@Ni_{12}P_5/PPy$ catalyst features excellent current density at low overpotential and long-term stability. Enhanced activity is primarily due to dual synergic charge transfer effects between the M-N sites. Electronegative N in PPy effectively induces surface enrichment of $Ni^{\delta++}$ at the $Ni_{12}P_5/PPy$ interface. This strong electron coupling between different layers decreases the charge transfer resistance to 2.93Ω with a low Tafel slope achieving faster kinetics. Utilizing only earth-abundant elements and materials, this catalyst outperforms the state of art $RuO_2$. This work offers the possibility of employing PPy shell as an excellent constituent for creating multiple M-N active sites, introducing a new class of polypyrrole analogues for enhancing the activity of metal-based catalysts.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A catalyst composition comprising:
 a catalyst core component, a shell component, and a catalyst outer component;
 wherein the catalyst core component comprises a composition having the chemical formula $M_xP_y$;
 where M is a transition metal;
 wherein x is a number from about 1 to about 20;
 wherein y is a number from about 1 to about 20;
 wherein the shell component comprises a conducting polymer; and
 wherein the catalyst outer component is a transition metal that is not the same as the transition metal M.

2. The catalyst composition of claim 1, wherein M is a transition metal selected from a metal from Group 3 to Group 12 of the periodic table that is a d-block metal.

3. The catalyst composition of claim 2, wherein M is Mn, Co, or Ni.

4. The catalyst composition of claim 2, wherein M is Ni.

5. The catalyst composition of claim 4, wherein $M_xP_y$ is $Ni_3P$, $Ni_{12}P_5$, $Ni_2P$, or $Ni_5P_4$.

6. The catalyst composition of claim 5, wherein $M_xP_y$ is $Ni_{12}P_5$.

7. The catalyst composition of claim 1, wherein the shell component comprises polypyrrole, polyaniline, polythiophene, or combinations thereof.

8. The catalyst composition of claim 7, wherein the shell component comprises polypyrrole.

9. The catalyst composition of claim 1, wherein the shell component has an interior surface in contact with the core catalyst; wherein the shell component has an exterior surface opposite the interior surface; and wherein the shell component has a thickness of about 100 nm to about 300 nm.

10. The catalyst composition of claim 1, wherein the catalyst outer component comprises Mn, Co, or Ni.

11. The catalyst composition of claim 10, wherein the catalyst outer component comprises Co.

12. The catalyst composition of claim 1, wherein the shell component has a thickness of about 10 nm to about 1000 nm.

13. The catalyst composition of claim 1, wherein the catalyst core has a three-dimensional shape such that the longest axis of the catalyst core three-dimensional shape is from about 100 nm to about 2 μm.

* * * * *